(12) United States Patent
Ponkshe et al.

(10) Patent No.: US 11,825,774 B2
(45) Date of Patent: Nov. 28, 2023

(54) BALER SYSTEM WITH PRESERVATIVE MONITORING

(71) Applicant: DEERE & COMPANY, Moline, IL (US)

(72) Inventors: Sampada Arun Ponkshe, Pune (IN); Sameer Subhash Upasani, Pune (IN); Gerald W. Shook, Des Moines, IA (US); Eric E. Steinhart, Ollie, IA (US); Kyle R. Teach, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/655,038

(22) Filed: Mar. 16, 2022

(65) Prior Publication Data
US 2023/0292669 A1 Sep. 21, 2023

(51) Int. Cl.
*A01F 15/08* (2006.01)

(52) U.S. Cl.
CPC ...... *A01F 15/0816* (2013.01); *A01F 15/0833* (2013.01)

(58) Field of Classification Search
CPC .......... A01F 15/0816; A01F 15/0833
See application file for complete search history.

(56) References Cited

U.S. PATENT DOCUMENTS

| | | | |
|---|---|---|---|
| 4,567,998 A * | 2/1986 | Cole | A01F 15/0816 222/533 |
| 4,916,888 A | 4/1990 | Sheehan et al. | |
| 4,918,910 A | 4/1990 | Sheehan et al. | |
| 5,074,473 A * | 12/1991 | Bauer | A01F 15/0816 239/113 |
| 7,503,510 B2 | 3/2009 | Vickers et al. | |
| 8,656,830 B2 | 2/2014 | Kraus | |
| 9,267,836 B2 | 2/2016 | Kraus | |
| 9,736,987 B2 | 8/2017 | Kraus | |

(Continued)

FOREIGN PATENT DOCUMENTS

WO WO 2021011767 A1 11/2021

OTHER PUBLICATIONS

Extended European Search Report and Written Opinion issued in European Patent Application No. 23160466.1, dated Aug. 3, 2023, in 08 pages.

*Primary Examiner* — Matthew Katcoff
*Assistant Examiner* — Mohammed S. Alawadi (57) ABSTRACT

A baler system is operable to determine an initial quantity of a preservative stored in a tank and define an application rate of the preservative to be applied per bale during a harvest operation. A number of bales to be formed during the harvest operation may be estimated, and a determination made on whether or not the initial quantity of the preservative at the defined application rate is sufficient to treat the estimated number of bales to be formed during the harvest operation. When a controller determines that the initial quantity of the preservative is not sufficient to treat the estimated number of bales to be formed during the harvest operation, the controller may send a notification to a system manager requesting additional preservative be delivered to the baler implement. The status of the preservative may be continuously monitored and updated throughout the harvest operation.

25 Claims, 3 Drawing Sheets

(56) References Cited

U.S. PATENT DOCUMENTS

2011/0099966 A1* 5/2011 Kraus ................ A01F 15/0816
56/341
2021/0176918 A1   6/2021 Franzen et al.
2021/0243950 A1   8/2021 Blank et al.

* cited by examiner

BALER SYSTEM WITH PRESERVATIVE MONITORING

TECHNICAL FIELD

The disclosure generally relates to a baler system with preservative monitoring, and a method of operating the baler system.

BACKGROUND

A baler implement gathers crop material and forms the crop material into a bale. The baler implement may include, but is not limited to, a round baler that forms the crop material into a cylindrical shape, or a square baler that forms the crop material into a parallelepiped or rectangular shape.

The crop material includes a moisture content. The moisture content may vary depending on weather conditions, crop conditions, soil conditions etc. Generally, crop material is considered to be "dry" when the moisture content of the crop material is between approximately 0% and 15%. Dry crop material may be baled and stored without a preservative. Crop material may be considered "semi-wet" when the moisture content of the crop material is between approximately 15% and 30%. Semi-wet crop material generally requires the addition of a preservative during the baling process, or must be completely wrapped in an air-tight wrap material shortly after the bale is formed. The addition of the preservative and/or wrapping of the bale reduces and/or eliminates spoilage of the crop material caused by mold and/or fungi. Crop material may be considered "wet" when the moisture content of the crop material is greater than approximately 30%. Generally, wet crop material is chopped and processed into silage, and is not generally formed into a bale for storage.

The preservative may include a liquid that is stored on the baler implement in a tank and applied or sprayed onto the crop material as the crop material is collected by the baler implement, immediately prior to being formed into the bale. The preservative may include a buffered propionic acid that reduces the ability of mold, yeast, and fungi to reproduce and respire. The amount of the preservative that is applied to the crop material may depend upon a number of factors, including but not limited to the moisture content of the crop material. For example, the preservative may include a suggested amount of solution volume per unit weight that should be applied at various moisture content levels of the crop material.

The quality of the crop material in a specific bale is dependent upon the proper amount of preservative being applied of the moisture content of the crop material in the bale. The quality of the crop material in each bale contributes significantly to the value of each bale. For this reason, it is desirable to properly treat the crop material of each bale with the proper amount of preservative. If the preservative system runs out of the preservative, baling operations must either stop until a re-supply of the preservative may be obtained, thereby reducing productivity, or the bales formed without the proper application of preservative, thereby reducing the quality and value of the bale.

SUMMARY

A baler system is provided. The baler system includes a baler implement having a baling chamber and a preservative system. The baling chamber is operable to receive crop material and form the crop material into a bale. The preservative system includes a tank and an applicator. The tank is operable to store a quantity of a preservative, and the applicator is operable to dispense the preservative onto the crop material. The baler system further includes a controller. The controller includes a processor and a memory having a preservative monitoring algorithm stored thereon. The processor is operable to execute the preservative monitoring algorithm to determine an initial quantity of the preservative stored in the tank, and define an application rate of the preservative to be applied per bale during a harvest operation. The processor may further estimate a value of a harvest characteristic during the harvest operation, and determine if the initial quantity of the preservative stored in the tank is sufficient to satisfy the estimated value of the harvest characteristic during the harvest operation at the defined application rate, or if the initial quantity of the preservative stored in the tank is not sufficient to satisfy the estimated value of the harvest characteristic during the harvest operation at the defined application rate. The processor may further execute the preservative monitoring algorithm to communicate a notification to a system manager. When the controller determines that the initial quantity of the preservative stored in the tank is not sufficient to satisfy the estimated value of the harvest characteristic during the harvest operation at the defined application rate, the notification may include a request for additional preservative.

In one aspect of the disclosure, the estimated value of the harvest characteristic may include, but is not limited to, one of an estimated number of bales to be formed during the harvest operation, an estimated amount of time the preservative may be applied during the harvest operation, an estimated area of the crop material that may be harvested during the harvest operation, or an estimated weight of the crop material that may be harvested during the harvest operation.

In one aspect of the disclosure, the processor may be operable to execute the preservative monitoring algorithm to generate a status signal. The status signal may indicate an estimated number of bales that may be treated with the initial quantity of the preservative stored in the tank at the defined application rate. The controller may communicate the status signal to a communicator, such as but not limited to a display in a cab of a tractor. The communicator may be configured to receive the status signal, and generate a message to the operator of the baler system. The message may indicate the estimated number of bales that may be treated with the initial quantity of the preservative in the tank at the defined preservative application rate.

In one aspect of the disclosure, the processor may be configured to execute the preservative monitoring algorithm to continuously monitor the status of the preservative system. For example, the controller may continuously determine an actual number of bales formed during the harvest operation, continuously sense a current quantity of the preservative stored in the tank during the harvest operation, and continuously update the status signal to indicate an estimated number of bales that may be treated with the preservative in the tank based on the actual number of bales previously formed during the harvest operation and the current quantity of the preservative stored in the tank.

In one aspect of the disclosure, the controller may continuously determine, e.g., measure and/or calculate, an actual application rate of the preservative applied per bale for the actual number of bales previously formed during the harvest operation, based on a difference between the initial quantity of preservative stored in the tank and the current quantity of the preservative stored in the tank.

The controller may continuously calculate a remaining number of bales to be formed during the harvest operation based on the estimate of the number of bales to be formed during the harvest operation and the actual number of bales previously formed during the harvest operation. The controller may then determine if the current quantity of the preservative stored in the tank is sufficient to treat the estimated remaining number of bales to be formed during the harvest operation at the actual application rate, or if the current quantity of the preservative stored in the tank is not sufficient to treat the estimated remaining number of bales to be formed during the harvest operation at the actual application rate. The controller may further communicate the notification to the system manager requesting additional preservative when the controller determines that the current quantity of the preservative stored in the tank is not sufficient to treat the estimated remaining number of bales to be formed during the harvest operation at the actual application rate.

In one aspect of the disclosure, the system manager may include an operator of a work vehicle. The work vehicle may include a communicator, such as but not limited to a visual output or display and/or an audio output. The processor may be configured to execute the preservative monitoring algorithm to communicate the notification to the system manager requesting additional preservative by communicating an electronic signal to the communicator of the work vehicle, whereby the electronic signal generates a message to the operator via the communicator. The operator may then request a re-supply of the preservative be delivered, for example, directly to the field supporting the harvest operation, thereby limiting downtime of the baler implement.

In one aspect of the disclosure, the system manager may include a computing device located remotely from the baler implement. The computing device may be configured to receive the notification from the controller, and to automatically request a re-supply of the preservative upon receipt of the notification. By so doing, the re-supply of the preservative may be delivered directly to the field prior to the preservative system running out of the preservative stored in the tank, thereby limiting downtime of the baler implement.

In one aspect of the disclosure, the processor may be configured to execute the preservative monitoring algorithm to control application of the preservative onto the crop material, based on at least one harvest related parameter. The at least one harvest related parameter may include, but is not limited to, one of a moisture content of the crop material, a mass flow rate of the crop material through the baler system, a current weather condition of a location of the harvest operation, a predicted weather condition of the location of the harvest operation, a moisture content of the soil of the location of the harvest operation, a surface elevation of the location of the harvest operation, a time period for the harvest operation, a date of the harvest operation, or an estimated number of bales remaining to be formed during the harvest operation.

A method of operating a baler implement is also provided. The method includes determining an initial quantity of a preservative stored in a tank of a preservative system of the baler implement with a controller. The controller may then define an application rate of the preservative to be applied during a harvest operation, and estimate a value of a harvest characteristic during the harvest operation. The controller may then determine if the initial quantity of the preservative stored in the tank is sufficient to satisfy the estimated value of the harvest characteristic during the harvest operation at the defined application rate, or if the initial quantity of the preservative stored in the tank is not sufficient to satisfy the estimated value of the harvest characteristic during the harvest operation at the defined application rate. When the initial quantity of the preservative stored in the tank is not sufficient to satisfy the estimated value of the harvest characteristic during the harvest operation at the defined application rate, the controller may communicate a notification to a communicator of a work vehicle to notify a system manager of the status of the preservative. The notification may include, but is not limited to, an instruction to request additional preservative.

In one aspect of the disclosure, the estimated value of the harvest characteristic may include, but is not limited to, one of an estimated number of bales to be formed during the harvest operation, an estimated amount of time the preservative may be applied during the harvest operation, an estimated area of the crop material that may be harvested during the harvest operation, or an estimated weight of the crop material that may be harvested during the harvest operation.

In one aspect of the disclosure, the method includes generating a status signal with the controller. The status signal indicates an estimated number of bales that may be treated with the initial quantity of the preservative stored in the tank. The controller may then communicate the status signal to the communicator, whereby the communicator generates a message to the system manager indicating the number of bales that may be treated.

The method may further include continuously monitoring the preservative system. For example, the controller may continuously determine an actual number of bales formed during the harvest operation, and continuously estimate a remaining number of bales to be formed during the harvest operation. The estimate of the remaining number of bales to be formed during the harvest operation may be based on the numerical difference between the initial estimate of the number of bales to be formed during the harvest operation and the actual number of bales previously formed during the harvest operation. The controller may then continuously sense a current quantity of the preservative stored in the tank during the harvest operation, and continuously determine, e.g., measure and/or calculate, an actual application rate of the preservative applied per bale for the actual number of bales previously formed during the harvest operation. The actual application rate of the preservative applied per bale may be based on a numerical difference between the initial quantity of preservative stored in the tank and the current quantity of the preservative stored in the tank.

The controller may continuously determine if the current quantity of the preservative stored in the tank is sufficient to treat the estimated remaining number of bales to be formed during the harvest operation at the actual application rate, or if the current quantity of the preservative stored in the tank is not sufficient to treat the estimated remaining number of bales to be formed during the harvest operation at the actual application rate. When the current quantity of the preservative stored in the tank is not sufficient to treat the estimated remaining number of bales to be formed during the harvest operation at the actual application rate, the controller may communicate the notification to the system manager requesting additional preservative.

In one aspect of the disclosure, the method described herein may continuously update the status signal to indicate the estimated number of bales that may be treated with the preservative in the tank at the actual application rate, based on the actual number of bales previously formed during the harvest operation and the current quantity of the preservative stored in the tank.

In one aspect of the disclosure, the system manager may include a computing device located remotely from the baler implement. The computing device may be configured to automatically request a re-supply of the preservative upon receipt of the notification. By so doing, the operator of the baler implement is not required to make the re-supply request, and the preservative may be automatically delivered to the baler implement on location.

In one aspect of the disclosure, the controller may automatically control the application rate of the preservative onto the crop material. The application rate of the preservative may be based on at least one harvest related parameter. The at least one harvest related parameter may include, but is not limited to, one of a moisture content of the crop material, a mass flow rate of the crop material through the baler system, a current weather condition of a location of the harvest operation, a predicted weather condition of the location of the harvest operation, a moisture content of the soil of the location of the harvest operation, a surface elevation of the location of the harvest operation, a time period for the harvest operation, a date of the harvest operation, or an estimated number of bales remaining to be formed during the harvest operation.

Accordingly, the baler system and method described herein enable monitoring of the preservative system, so that the request for a re-supply of the preservative may be timely made. For example, the baler system may notify the operator of the baler implement, who may then manually request preservative re-supply. In another implementation, the baler system may notify a remote system manager, such as an automated computing device, which automatically requests the preservative re-supply be delivered on site. In so doing, the preservative system may be timely replenished without undue downtime, thereby maintaining the high quality of the crop material in the bales, and increasing operating efficiency of the baler implement.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a baler system 20 is generally shown at 20. The baler system 20 includes a baler implement 22. In one implementation, the baler implement 22 may include a self-propelled implement. In another implementation, such as the example implementation shown in FIGS. 1 and 2, the baler system 20 includes a work vehicle 24, e.g., an agricultural tractor, in combination with a drawn baler implement 22. The work vehicle 24 may include a moveable platform capable of moving the baler implement 22 through a field to collect and bale 26 crop material. The specific features and configuration of the work vehicle 24, other than the features described herein, are not pertinent to the teachings of this disclosure, and are therefore not described in greater detail.

Figure 1:
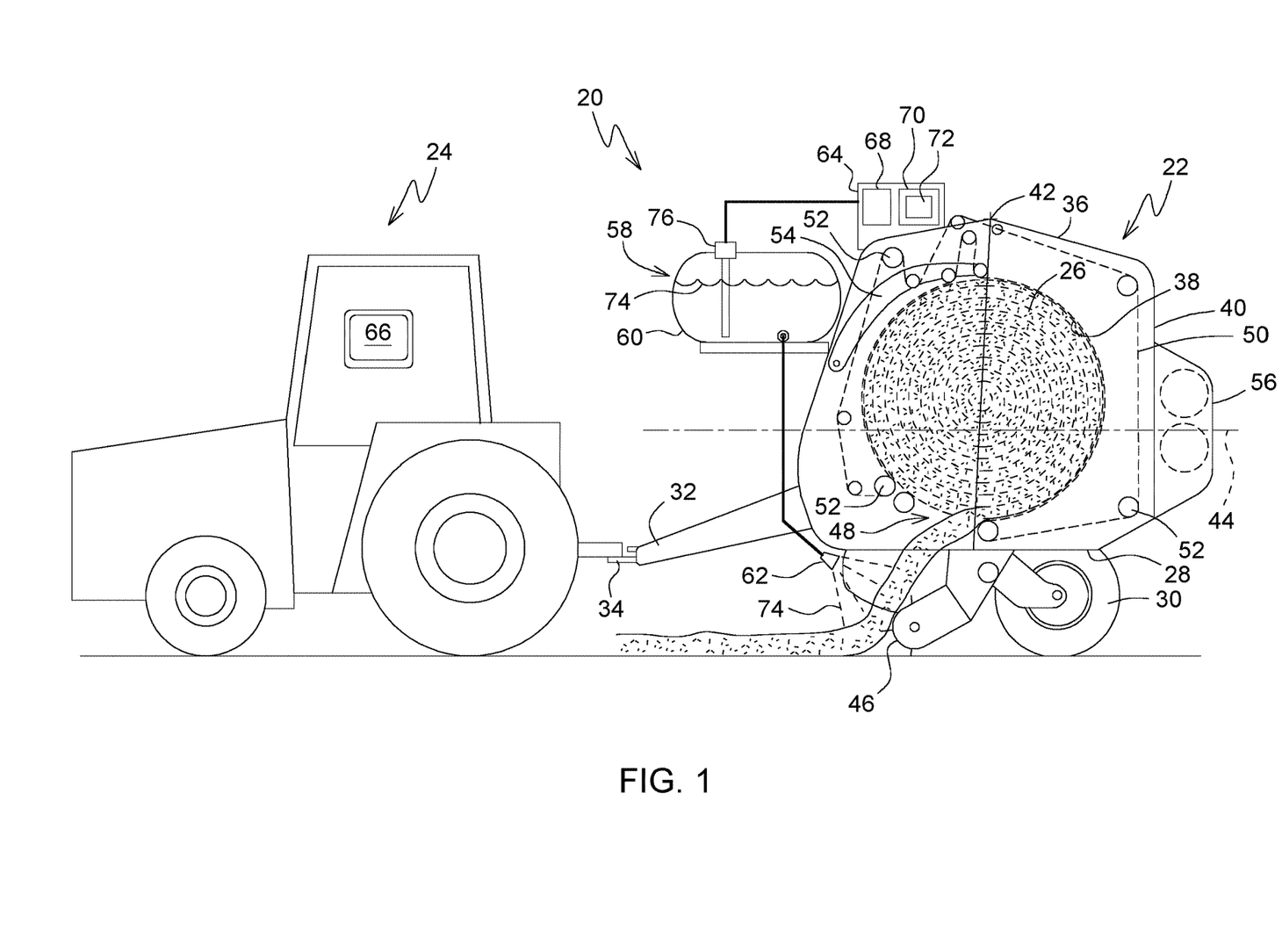
FIG. 1 is a schematic side view of a baler system.

During operation, the baler implement 22 moves through a field. As the baler implement 22 moves through the field, the baler implement 22 gathers crop material and forms the crop material into a bale 26. The baler implement 22 may include an implement that forms the crop material into any suitable shape. For example, the baler implement 22 may include a round baler that forms the bale 26 to include a cylindrical shape, or a square baler that forms the crop material to include a parallelepiped or rectangular shape. It should be appreciated that the baler implement 22 may form the bale 26 to include any desirable size, and that the baler implement 22 may be configured to form the crop material into a bale 26 having a shape and size different than the example implementation described herein.

Referring to FIG. 1, the example implementation of the baler implement 22 shown in the Figures and described herein is configured as a round baler. However, as noted above, it should be appreciated that the baler implement 22 may be configured differently than the example implementation of the round baler. For example, in other implementations, the baler implement 22 may be configured as a large square baler. The example implementation of the baler implement 22 configured as a round baler is generally described below.

The baler implement 22 includes a frame 28. One or more ground engaging elements 30, such as but not limited to one or more wheels and/or tracks, are attached to and rotatably supported by the frame 28. A tongue 32 may be coupled to the frame 28 at a forward end of the frame 28. A hitch arrangement 34 may be included with the tongue 32. The hitch arrangement 34 may be used to attach the baler implement 22 to a traction unit, i.e., the work vehicle 24. In other embodiments, the baler implement 22 may be self-propelled, in which case the traction unit and the baler implement 22 are configured as a single, self-propelled vehicle.

The baler implement 22 includes a housing 36 forming a baling chamber 38. The housing 36 is attached to and supported by the frame 28. The housing 36 may include one or more walls or panels that at least partially enclose and/or define the baling chamber 38. The baler implement 22 further includes a gate 40. The gate 40 is attached to and rotatably supported by the housing 36. The gate 40 is positioned adjacent a rearward end of the frame 28 and is pivotably moveable about a gate axis 42. The gate axis 42 is generally horizontal and perpendicular to a central longitudinal axis 44 of the frame 28. The gate 40 is moveable between a closed position for forming the bale 26 within the baling chamber 38, and an open position for discharging the bale 26 from the baling chamber 38.

The baler implement 22 includes a pick-up 46 disposed proximate the forward end of the frame 28. The pickup gathers crop material from a ground surface and directs the gathered crop material toward and into an inlet 48 of the baling chamber 38. The pickup may include, but is not limited to tines, forks, augers, conveyors, baffles, etc., for gathering and moving the crop material. The baler implement 22 may be equipped with a pre-cutter, disposed between the pickup and the inlet 48. As such, the pre-cutter is disposed downstream of the pickup and upstream of the inlet 48 relative to a direction of travel of the crop material. The pre-cutter cuts or chops the crop material into smaller pieces.

The baler implement 22 shown in the Figures and described herein is depicted and described as a variable chamber round baler. As is understood by those skilled in the art, the variable chamber baler includes a plurality of longitudinally extending side-by-side forming belts 50 that are supported by a plurality of rollers 52. The bale 26 is formed by the forming belts 50 and one or more side walls of the housing 36. In other implementations, however, the baler implement 22 may be configured as a fixed chamber round baler, as is understood by those skilled in the art.

The crop material is directed through the inlet 48 and into the baling chamber 38, whereby the forming belts 50 roll the crop material in a spiral fashion into the bale 26 having a cylindrical shape. The belts apply a constant pressure to the crop material as the crop material is formed into the bale 26. A belt tensioner 54 continuously moves the forming belts 50 radially outward relative to a center of the cylindrical bale 26 as the diameter of the bale 26 increases. The belt tensioner 54 maintains the appropriate tension in the belts to obtain the desired density of the crop material.

The baler implement 22 includes a wrap system 56. The wrap system 56 is operable to wrap the bale 26 with a wrap material inside the baling chamber 38. Once the bale 26 is formed to a desired size, the wrap system 56 feeds the wrap material into the baling chamber 38 to wrap the bale 26 and thereby secure the crop material in a tight package and maintain the desired shape of the bale 26. The wrap material may include, but is not limited to, a twine, a net mesh, or a solid plastic wrap. Movement of the gate 40 into the open position simultaneously moves the belts clear of the formed bale 26, and allows the formed and wrapped bale 26 to be discharged through the rear of the baling chamber 38.

The baler system 20, whether configured in the example implementation shown in the Figures and described herein as the round baler, or as configured differently than described herein, such as but not limited to a large square baler, further includes a preservative system 58. The preservative system 58 includes, but is not limited to, a tank 60 and an applicator 62. The tank 60 is attached to and/or supported by the frame 28. The tank 60 is operable to store a quantity of a preservative 74 therein. The preservative 74 may include, but is not limited to, a buffered propionic acid in liquid form as is understood by those skilled in the art. However, it should be appreciated that the preservative 74 may include some other solution not mentioned or described herein. Additionally, it should be appreciated that the preservative 74 may be in a form other than a liquid solution, such as but not limited to a granular or powder form.

The applicator 62 is in fluid communication with the tank 60 for receiving the preservative 74 from the tank 60. The applicator 62 is operable to dispense the preservative 74 onto the crop material. The applicator 62 may include one or more nozzles or other devices for dispensing the preservative 74 onto the crop material. The tank 60 and the applicator 62 may be configured and operate in a suitable manner. The specific configuration and operation of the tank 60 and the applicator 62, other than described herein, are not pertinent to the teachings of this disclosure, are understood by those skilled in the art, and are therefore not described in greater detail herein.

Figure 2:
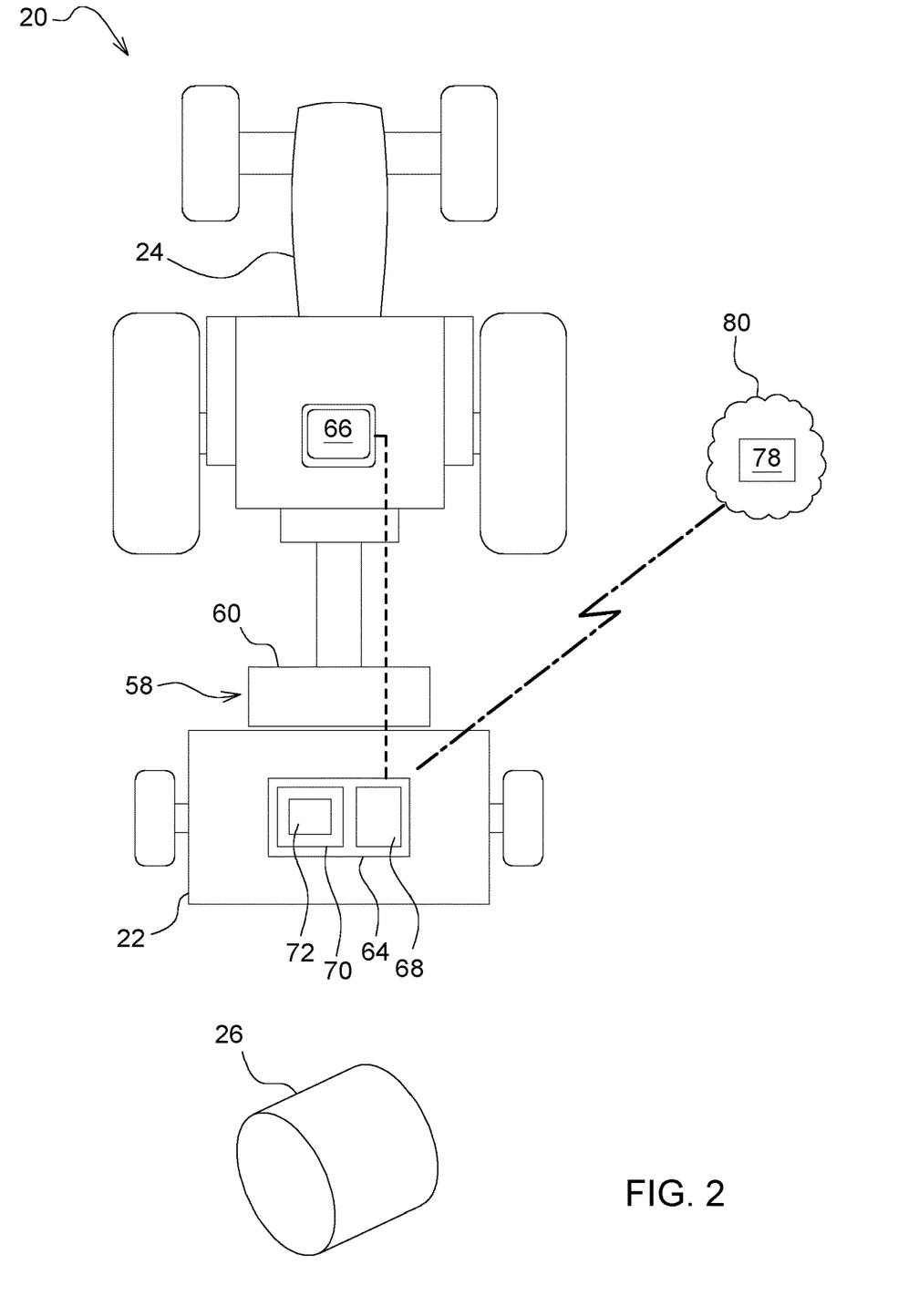
FIG. 2 is a schematic top plan view of the baler system executing a harvest operation.

The baler system 20 further includes a controller 64. The controller 64 is disposed in communication with the preservative system 58. The baler system 20 may further include a communicator 66 disposed in communication with the controller 64. The controller 64 is operable to control the operation of the preservative system 58 and communicate messages to a system manager, as described in greater detail below. While the controller 64 is generally described herein as a singular device, it should be appreciated that the controller 64 may include multiple devices linked together to share and/or communicate information therebetween. Furthermore, it should be appreciated that the controller 64 may be located on the baler implement 22 or located remotely from the baler implement 22. For example, the controller 64 may be located on the work vehicle 24 associated with the baler implement 22, and/or at a location 80 remote from the baler implement 22 and the work vehicle 24.

The controller 64 may alternatively be referred to as a computing device, a computer, a control unit, a control module, a module, etc. The controller 64 includes a processor 68, a memory 70, and all software, hardware, algorithms, connections, sensors, etc., necessary to manage and control the operation of the preservative system 58. As such, a method may be embodied as a program or algorithm operable on the controller 64. It should be appreciated that the controller 64 may include any device capable of analyzing data from various sensors, comparing data, making decisions, and executing the required tasks described herein.

As used herein, "controller" is intended to be used consistent with how the term is used by a person of skill in the art, and refers to a computing component with processing, memory, and communication capabilities, which is utilized to execute instructions (i.e., stored on the memory 70 or received via the communication capabilities) to control or communicate with one or more other components. In certain embodiments, the controller 64 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 64 may be in communication with other components on the baler implement 22 and/or the work vehicle 24, such as hydraulic components, electrical components, and operator inputs within an operator station of the associated work vehicle 24. The controller 64 may be electrically connected to these other components by a wiring harness such that messages, commands, and electrical power may be transmitted between the controller 64 and the other components. Although the controller 64 is referenced in the singular, in alternative embodiments the configuration and functionality described herein can be split across multiple devices using techniques known to a person of ordinary skill in the art.

The controller 64 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 70 may include any non-transitory/tangible medium which participates in providing data or computer-readable instructions. The memory 70 may be non-volatile or volatile. Non-volatile media may include, for example, optical or magnetic disks and other persistent memory. Example volatile media may include dynamic random access memory (DRAM), which may constitute a main memory. Other examples of embodiments for memory 70 include a floppy, flexible disk, or hard disk, magnetic tape or other magnetic medium, a CD-ROM, DVD, and/or any other optical medium, as well as other possible memory devices such as flash memory.

The controller 64 includes the tangible, non-transitory memory 70 on which are recorded computer-executable instructions, including a preservative monitoring algorithm 72. The processor 68 of the controller 64 is configured for executing the preservative monitoring algorithm 72. The preservative monitoring algorithm 72 implements a method of operating the baler implement 22, described in detail below.

Figure 3:
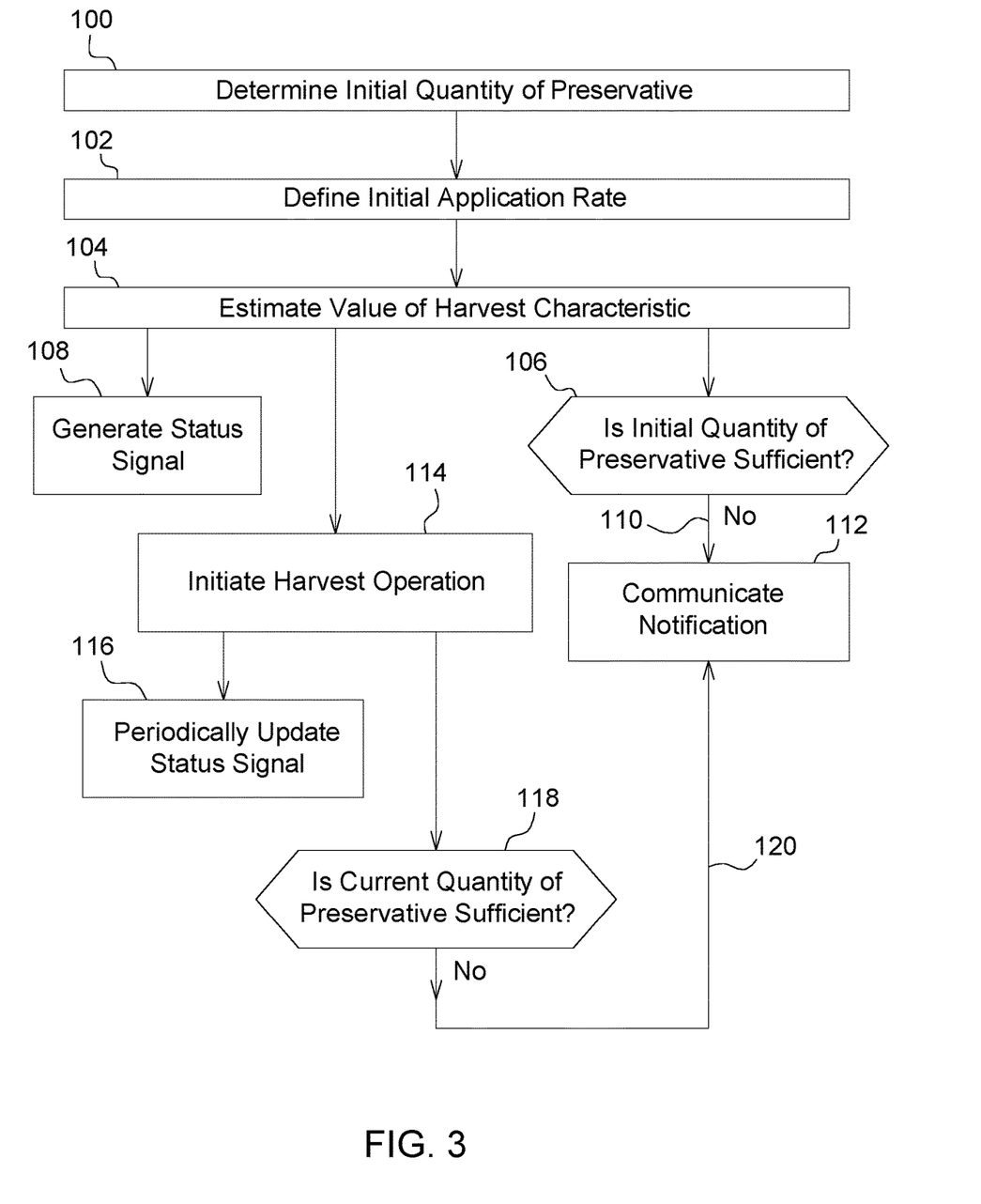
FIG. 3 is a flow chart representing a method of operating the baler system.

Referring to FIG. 3, the method of operating the baling implement includes the controller 64 determining an initial quantity of the preservative 74 stored in the tank 60. The step of determining the initial quantity of the preservative 74 is generally indicated by box 100 shown in FIG. 3. As used herein, the initial quantity of the preservative 74 may be defined as the quantity of the preservative 74 in the tank 60 at the beginning of a harvest operation. The harvest operation may be considered a discrete time/area in which harvest operations are intended. For example, the harvest operation may be defined to include a specific field or combination of fields. In other embodiments, the harvest operation may be defined to include baling operations for a defined period of time. For example, the harvest operation may be defined to include a period of time during a single day.

The controller 64 may determine the initial quantity of the preservative 74 stored in the tank 60 in any suitable manner. For example, the tank 60 may be equipped with a level sensor 76 that senses a fluid level of the preservative 74. The level sensor 76 may output a sensor signal to the controller 64 indicating the fluid level of the preservative 74 in the tank 60. The controller 64 may then correlate the sensor signal and/or the fluid level into a volume or quantity of the preservative 74 in the tank 60, i.e., the initial quantity of the preservative 74. In other embodiments, the controller 64 may measure and/or calculate the initial quantity of the preservative 74 stored in the tank 60 based on prior user input and usage. It should be appreciated that the controller 64 may determine the initial quantity of the preservative 74 stored in the tank 60 in some other manner not described herein.

The controller 64 may further define an initial application rate of the preservative 74 to be applied during the harvest operation. The initial application rate of the preservative may be defined based on a per bale 26 rate, rate per unit volume, or a rate based on a mass flow of the crop material through the baler implement. The step of defining the initial application rate is generally indicated by box 102 shown in FIG. 3. The application rate of the preservative 74 may be defined as a unit weight or unit volume of the preservative 74 applied per unit weight or unit volume of the crop material. In one implementation, the estimated application rate may be input into the controller 64 by an operator of the baler implement 22. In another application, the controller 64 may automatically define the estimated application rate of the preservative 74 based on one or more harvest related parameters. The one or more harvest related parameters may include, but are not limited to, one of a moisture content of the crop material, a mass flow rate of the crop material through the baler system, a current weather condition of a location of the harvest operation, a predicted weather condition of the location of the harvest operation, a moisture content of the soil of the location of the harvest operation, a surface elevation of the location of the harvest operation, a time period for the harvest operation, a date of the harvest operation, or an estimated number of bales 26 remaining to be formed during the harvest operation. It should be appreciated that the controller 64 may define the initial application rate of the preservative 74 in some other manner not described herein.

In one implementation of the process described herein, a moisture content of the crop material may be sensed or otherwise determined in situ. For example, the moisture content of the crop material may be sensed while in a windrow, and prior to collection and baling by the baler implement 22. The moisture content of the crop material may be sensed and/or determined in a suitable, such as but not limited to using a drone with NIR sensing technology, or by inserting a probe into the windrow of the crop material. This moisture content may be communicated to the controller 64, which may then use the moisture content of the crop material prior to baling with the baler implement to determine the initial application rate of the preservative 74 more accurately.

The controller 64 may further estimate a value of a harvest characteristic during the harvest operation. The value of the harvest characteristic may include, but is not limited to, one of an estimated number of bales 26 to be formed during the harvest operation, an estimated amount of time the preservative may be applied during the harvest operation, an estimated area of the crop material that may be harvested during the harvest operation, or an estimated weight of the crop material that may be harvested during the harvest operation. The example implementation of the process described below defines the value of the harvest characteristic as an estimated number of bales 26 to be formed during the harvest operation. However, it should be appreciated that other implementations may define the value of the harvest characteristic differently than the example implementation. The step of estimating the number of bales 26 to be formed is generally indicated by box 104 shown in FIG. 3. In one implementation, the controller 64 may estimate the number of bales 26 to be formed during the harvest operation based on one or more factors, such as but not limited to, a geographic size of a field supporting the harvest operation, the crop density, previous crop yield for that given location, etc. In another embedment, the controller 64 may estimate the number of bales 26 to be formed during the harvest operation based on an input by the operator of the baler implement 22. It should be appreciated that the controller 64 may estimate the number of bales 26 to be formed during the harvest operation in some other manner not described herein.

The controller 64 may then determine if the initial quantity of the preservative 74 stored in the tank 60 is sufficient to treat the estimated number of bales 26 to be formed during the harvest operation at the estimated application rate, or if the initial quantity of the preservative 74 stored in the tank 60 is not sufficient to treat the estimated number of bales 26 to be formed during the harvest operation at the estimated application rate. The step of determining if the initial quantity of the preservative 74 is or is not sufficient is generally indicated by box 106 shown in FIG. 3. The controller 64 may make this determination by, for example, multiplying the initial application rate for the preservative 74 per each bale 26 by the estimated number of bales 26 to be formed during the harvest operation to obtain an estimated total amount of preservative 74 required for the harvest operation. If the estimated total amount of preservative 74 required for the harvest operation is less than the initial quantity of the preservative 74 stored in the tank 60, the controller 64 may determine that the initial quantity of the preservative 74 stored in the tank 60 is sufficient to treat the estimated number of bales 26 to be formed during the harvest operation at the estimated application rate. However, if the estimated total amount of preservative 74 required for the harvest operation is greater than the initial quantity of the preservative 74 stored in the tank 60, the controller 64 may determine that the initial quantity of the preservative 74 stored in the tank 60 is not sufficient to treat the estimated number of bales 26 to be formed during the harvest operation at the estimated application rate. It should be appreciated that the controller 64 may determine if the initial quantity of the preservative 74 stored in the tank 60 is or is not sufficient to treat the estimated number of bales 26 to be formed during the harvest operation in some other manner not described herein.

The controller 64 may generate a status signal, and communicate the status signal to the communicator 66. The step of generating the status signal is generally indicated by box 108 shown in FIG. 3. The communicator 66 may include a device that is operable to receive the status signal and communicate a message to the operator of the baler system 20. For example, the communicator 66 may include, but is not limited to, a visual display, a warning light, or an audio output device. The message generated by the communicator 66 from the status signal may indicate an estimated number of bales 26 that may be treated with the initial quantity of the preservative 74 stored in the tank 60. The message generated by the communicator 66 from the status signal may further indicate the estimated number of bales 26 to be formed during the harvest operation. By notifying the operator of this information, the operator may determine if additional preservative 74 should be requested to complete the harvest operation, or otherwise make decisions regarding the application and/or application rate of the preservative 74 prior to initiating the harvest operation.

When the controller 64 determines that the initial quantity of the preservative 74 stored in the tank 60 is not sufficient to treat the estimated number of bales 26 to be formed during the harvest operation at the initial estimated application rate, generally indicated at 110, then the controller 64 may communicate a notification to the system manager requesting additional preservative 74 and/or order a re-supply of the preservative 74. The step of communicating the notification is generally indicated by box 112 shown in FIG. 3. For example, the re-supply of the preservative 74 may be delivered to the baler implement 22 in the field, thereby reducing downtime of the baler implement 22.

In one implementation, the system manager may include the operator of the work vehicle 24. The controller 64 may communicate the notification to the operator via the communicator 66 in the work vehicle 24. As noted above, the communicator 66 may include, but is not limited to, a visual display, a warning light, or an audio output device. As such, the notification may include, but is not limited to, an electronic signal that generates a message to the operator via the communicator 66. The message may include, but is not limited to, a text message, a visual message, or an audible message. The message may include, but is not limited to, a request to order additional or a re-supply of the preservative 74. Accordingly, by notifying the operator that the initial quantity of the preservative 74 stored in the tank 60 may be insufficient to properly treat the estimated number of bales 26 to be formed during the harvest operation, the operator may request the re-supply of the preservative 74 prior to beginning the harvest operation, thereby allowing time for delivery so that down time of the baler implement 22 is reduced or eliminated.

In another implementation, the system manager may include a computing device 78 located remotely from the baler implement 22 and/or the work vehicle 24 associated with the baler implement 22. The computing device 78 may be configured to automatically or autonomously request a re-supply of the preservative 74 upon receipt of the notification. For example, the system manager may include a cloud-based service that automatically receives the notification and requests a re-supply of the preservative 74 be delivered to the baler implement 22 at the location of the harvest operation.

The operator of the work vehicle 24 may initiate the harvest operation. The step of initiating the harvest operation is generally indicated by box 114 shown in FIG. 3. The controller 64 may be configured to control application of the preservative 74 onto the crop material based on at least one harvest related parameter. In other words, the controller 64 may be configured to control the application rate of the preservative 74 based on one or more of the harvest related parameters. As noted above, the harvest related parameter may include, but is not limited to, one of a moisture content of the crop material, a mass flow rate of the crop material through the baler system, a current weather condition of a location of the harvest operation, a predicted weather condition of the location of the harvest operation, a moisture content of the soil of the location of the harvest operation, a surface elevation of the location of the harvest operation, a time period for the harvest operation, a date of the harvest operation, or an estimated number of bales 26 remaining to be formed during the harvest operation. Because the preservative 74 is often expensive, automatically controlling the application rate of the preservative 74 for the specific field conditions may reduce the overall amount of preservative 74 applied, thereby reducing costs.

The controller 64 may be configured to periodically or continuously monitor the preservative system 58, and periodically or continuously update the status signal and/or the notification throughout the harvest operation. The step of periodically updating the status signal and/or the notification is generally indicated by box 116 shown in FIG. 3. As such, the controller 64 may continuously determine an actual number of bales 26 formed during the harvest operation. The controller 64 may determine the actual number of bales 26 formed during the harvest operation in a suitable manner. For example, in one implementation, the baler implement 22 may be equipped with one or more sensors that detect the completion of a bale 26 and communicates such data to the controller 64. Alternatively, in another implementation, one or more cameras may be disposed in communication with the controller 64 to capture images of the field, thereby allowing the controller 64 to identify and count the actual number of bales 26 formed during the harvest operation. It should be appreciated that the controller 64 may determine the actual number of bales 26 in some other manner not described herein. The equipment and processes for determining the actual number of bales 26 formed during the harvest operation are known to those skilled in the art and are therefore not described in greater detail herein.

The controller 64 may be configured to estimate a remaining number of bales 26 to be formed during the harvest operation. The controller 64 may estimate the remaining number of bales 26 to be formed based on the initial estimate of the number of bales 26 to be formed during the harvest operation and the actual number of bales 26 previously formed during the harvest operation. For example, the controller 64 may subtract the actual number of bales 26 previously formed during the harvest operation from the initial estimate of the number of bales 26 to be formed during the harvest operation to calculate the remaining number of bales 26 yet to be formed during the harvest operation. It should be appreciated that the controller 64 may estimate or calculate the remaining number of bales 26 to be formed during the harvest operation in some other manner not described herein.

It should be appreciated that once the harvest operation begins and the baler implement 22 treats the bales 26 formed with the preservative 74, the quantity of the preservative 74 stored in the tank 60 decreases. The controller 64 may further be configured to periodically or continuously sense or otherwise determine a current quantity of the preservative 74 stored in the tank 60 during the harvest operation. The controller 64 may sense or determine the current quantity of the preservative 74 stored in the tank 60 in a suitable manner. For example, as described above, the tank 60 may be equipped with the level sensor 76 that senses the fluid level of the preservative 74. The level sensor 76 may output the sensor signal to the controller 64 indicating the fluid level of the preservative 74 in the tank 60. The controller 64 may then correlate the sensor signal and/or the fluid level into a current volume or quantity of the preservative 74 in the tank 60. In other embodiments, the controller 64 may measure and/or calculate the current quantity of the preservative 74 stored in the tank 60 based on prior user input and actual prior usage. It should be appreciated that the controller 64 may determine the current quantity of the preservative 74 stored in the tank 60 in some other manner not described herein.

The controller 64 may measure and/or calculate an actual application rate of the preservative 74 applied per bale 26 for the actual number of bales 26 previously formed during the harvest operation. For example, the controller 64 may sense or measure a flow rate of the preservative 74 via a flow rate sensor or other similar device. In another implementation, for example, the controller 64 may calculate the actual application rate of the preservative 74 based on the initial quantity of preservative 74 stored in the tank 60, the current quantity of the preservative 74 stored in the tank 60, and the actual number of bales 26 formed during the harvest operation. For example, the controller 64 may calculate a numerical difference between the initial quantity of preservative 74 stored in the tank 60 prior to beginning the harvest operation and the current quantity of preservative 74 stored in the tank 60 to define a used quantity of preservative 74. The used quantity of preservative 74 may then be divided by the actual number of bales 26 formed during the harvest operation to calculate the actual application rate of the preservative 74 applied per bale 26 during the harvest operation. It should be appreciated that the actual application rate of the preservative 74 applied per bale 26 during the harvest operation may be determined and/or calculated in some other manner not described herein.

The control may determine if the current quantity of the preservative 74 stored in the tank 60 is sufficient to treat the estimated remaining number of bales 26 to be formed during the harvest operation at the actual application rate, or if the current quantity of the preservative 74 stored in the tank 60 is not sufficient to treat the estimated remaining number of bales 26 to be formed during the harvest operation at the actual application rate. The step of determining if the current quantity of the preservative 74 is or is not sufficient to treat the remaining number of bales 26 is generally indicated by box 118 shown in FIG. 3. The controller 64 may make this determination by, for example, multiplying the actual application rate for the preservative 74 per each bale 26 by the estimated remaining number of bales 26 to be formed during the harvest operation to obtain an estimated remaining amount of preservative 74 required for the harvest operation. If the estimated remaining amount of preservative 74 required for the harvest operation is less than the current quantity of the preservative 74 stored in the tank 60, the controller 64 may determine that the current quantity of the preservative 74 stored in the tank 60 is sufficient to treat the estimated remaining number of bales 26 to be formed during the harvest operation at the actual application rate. However, if the estimated remaining amount of preservative 74 required for the harvest operation is greater than the current quantity of the preservative 74 stored in the tank 60, the controller 64 may determine that the current quantity of the preservative 74 stored in the tank 60 is not sufficient to treat the estimated remaining number of bales 26 to be formed during the harvest operation at the actual application rate. It should be appreciated that the controller 64 may determine if the current quantity of the preservative 74 stored in the tank 60 is or is not sufficient to treat the estimated remaining number of bales 26 to be formed during the harvest operation in some other manner not described herein.

When the controller 64 determines that the current quantity of the preservative 74 stored in the tank 60 is not sufficient to treat the estimated remaining number of bales 26 to be formed during the harvest operation at the actual application rate, generally indicated at 120, then the controller 64 may communicate the notification to the system manager requesting additional preservative 74 and/or a resupply of the preservative 74 for the baler implement 22. The step of communicating the notification is generally indicated at box 112 shown in FIG. 3. This may occur, for example, if the actual application rate of the preservative 74 is higher than the initial application rate of the preservative 74, thereby using more preservative 74 then was originally estimated. By so doing, the baler implement 22 may be resupplied with the preservative 74 before the tank 60 empties, thereby minimizing or eliminating down time of the baler implement 22.

The controller 64 may further continuously update the status signal to indicate the estimated number of bales 26 that may be treated with the preservative 74 in the tank 60 at the actual application rate. The estimated number of bales 26 that may be treated with the preservative 74 in the tank 60 may be calculated or determined based on the current quantity of the preservative 74 stored in the tank 60 and the actual application of the preservative 74 per each bale 26. For example, the controller 64 may divide the current quantity of the preservative 74 stored in the tank 60 by the actual application rate of the preservative 74 per bale 26 to define the estimated number of bales 26 that may be treated with the preservative 74 in the tank 60 at the actual application rate.

The example implementation of the process described defined the value of the harvest characteristic as the number of bales to be formed during the harvest operation. However, as noted above, the value of the harvest characteristic may be defined differently. For example, the value of the harvest characteristic may alternatively be defined to include, but is not limited to, one of an estimated amount of time the preservative may be applied during the harvest operation, an estimated area of the crop material that may be harvested during the harvest operation, or an estimated weight of the crop material that may be harvested during the harvest operation.

If the value of the harvest characteristic is defined to include the estimated amount of time the preservative may be applied during the harvest operation, then the controller may determine if the initial quantity of the preservative stored in the tank is sufficient to treat the crop material for a desired period of time. The controller may communicate the notification to the system manager requesting addition preservative when the controller determines that the initial quantity of the preservative stored in the tank is not sufficient to treat the crop material at the defined application rate for the desired period of time.

If the value of the harvest characteristic is defined to include the estimated area of the crop material that may be harvested during the harvest operation at the defined application rate, then the controller may determine if the initial quantity of the preservative stored in the tank is sufficient to treat a defined area, i.e., acreage, of crop material. The controller may communicate the notification to the system manager requesting addition preservative when the controller determines that the initial quantity of the preservative stored in the tank is not sufficient to treat the defined area of the crop material at the defined application rate.

If the value of the harvest characteristic is defined to include the estimated weight, e.g., tonnage, of the crop material that may be harvested during the harvest operation at the defined application rate, then the controller may determine if the initial quantity of the preservative stored in the tank is sufficient to treat a defined weight, i.e., tonnage, of the crop material. The controller may communicate the notification to the system manager requesting addition preservative when the controller determines that the initial quantity of the preservative stored in the tank is not sufficient to treat the defined weight of the crop material at the defined application rate.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler system comprising:
   a baler implement including a baling chamber and a preservative system, wherein the baling chamber is operable to receive a crop material and form the crop material into a bale, and wherein the preservative system includes a tank operable to store a quantity of a preservative and an applicator operable to dispense the preservative onto the crop material;
   a controller including a processor and a memory having a preservative monitoring algorithm stored thereon, wherein the processor is operable to execute the preservative monitoring algorithm to:
   determine an initial quantity of the preservative stored in the tank;
   define an application rate of the preservative to be applied per bale during a harvest operation;
   estimate a value of a harvest characteristic during the harvest operation;
   determine if the initial quantity of the preservative stored in the tank is sufficient to satisfy the estimated value of the harvest characteristic during the harvest operation at the defined application rate, or if the initial quantity of the preservative stored in the tank is not sufficient to satisfy the estimated value of the harvest characteristic during the harvest operation at the defined application rate; and
   communicate a notification to a system manager requesting additional preservative when the controller determines that the initial quantity of the preservative stored in the tank is not sufficient to satisfy the estimated value of the harvest characteristic during the harvest operation at the defined application rate.

2. The baler system set forth in claim 1, wherein the estimated value of the harvest characteristic includes an estimated number of bales to be formed during the harvest operation.

3. The baler system set forth in claim 2, wherein the processor is operable to execute the preservative monitoring algorithm to generate a status signal indicating an estimated number of bales that may be treated with the initial quantity of the preservative stored in the tank.

4. The baler system set forth in claim 3, further comprising a communicator operable to receive the status signal and communicate a message to an operator of the baler system indicating the estimated number of bales that may be treated with the initial quantity of the preservative in the tank.

5. The baler system set forth in claim 3, wherein the processor is operable to execute the preservative monitoring algorithm to continuously determine an actual number of bales formed during the harvest operation, continuously sense a current quantity of the preservative stored in the tank during the harvest operation, and continuously update the status signal to indicate an estimated number of bales that may be treated with the preservative in the tank based on the current quantity of the preservative stored in the tank and an actual application rate of the preservative applied per bale.

6. The baler system set forth in claim 1, wherein the processor is operable to execute the preservative monitoring algorithm to continuously sense a current quantity of the preservative stored in the tank during the harvest operation.

7. The baler system set forth in claim 6, wherein the processor is operable to execute the preservative monitoring algorithm to determine an actual application rate of the preservative applied during the harvest operation, based on a difference between the initial quantity of preservative stored in the tank and the current quantity of the preservative stored in the tank.

8. The baler system set forth in claim 7, wherein the processor is operable to execute the preservative monitoring algorithm to continuously determine an actual number of bales formed during the harvest operation.

9. The baler system set forth in claim 8, wherein the processor is operable to execute the preservative monitoring algorithm to determine the actual application rate of the preservative applied per bale for the actual number of bales previously formed.

10. The baler system set forth in claim 8, wherein the processor is operable to execute the preservative monitoring algorithm to estimate a remaining number of bales to be formed during the harvest operation based on the estimate of the number of bales to be formed during the harvest operation and the actual number of bales previously formed during the harvest operation.

11. The baler system set forth in claim 10, wherein the processor is operable to execute the preservative monitoring algorithm to determine if the current quantity of the preservative stored in the tank is sufficient to treat the estimated remaining number of bales to be formed during the harvest operation at the actual application rate, or if the current quantity of the preservative stored in the tank is not sufficient to treat the estimated remaining number of bales to be formed during the harvest operation at the actual application rate.

12. The baler system set forth in claim 11, wherein the processor is operable to execute the preservative monitoring algorithm to communicate the notification to the system manager requesting additional preservative when the controller determines that the current quantity of the preservative stored in the tank is not sufficient to treat the estimated remaining number of bales to be formed during the harvest operation at the actual application rate.

13. The baler system set forth in claim 1, wherein the system manager includes an operator of a work vehicle having a communicator, and wherein the processor is operable to execute the preservative monitoring algorithm to communicate the notification to the system manager requesting additional preservative by communicating an electronic signal to the communicator of the work vehicle, whereby the electronic signal generates a message to the operator via the communicator.

14. The baler system set forth in claim 1, wherein the system manager includes a computing device located remotely from the baler implement and operable to automatically request a re-supply of the preservative upon receipt of the notification.

15. The baler system set forth in claim 1, wherein the processor is operable to execute the preservative monitoring algorithm to control application of the preservative onto the crop material based on at least one harvest related parameter.

16. The baler system set forth in claim 15, wherein the at least one harvest related parameter includes one of a moisture content of the crop material, a mass flow rate of the crop material, a current weather condition of a location of the harvest operation, a predicted weather condition of the location of the harvest operation, a moisture content of the soil of the location of the harvest operation, a surface elevation of the location of the harvest operation, a time period for the harvest operation, a date of the harvest operation, or an estimated number of bales remaining to be formed during the harvest operation.

17. The baler system set forth in claim 1, wherein the estimated value of the harvest characteristic includes one of an estimated number of bales to be formed during the harvest operation, an estimated amount of time the preservative may be applied during the harvest operation, an estimated area of the crop material that may be harvested during the harvest operation, or an estimated weight of the crop material that may be harvested during the harvest operation.

18. A method of operating a baler implement, the method comprising:
    determining an initial quantity of a preservative stored in a tank of a preservative system of the baler implement, with a controller;
    defining an application rate of the preservative to be applied during a harvest operation, with the controller;
    estimating a value of a harvest characteristic during the harvest operation, with the controller;
    determining, with the controller, if the initial quantity of the preservative stored in the tank is sufficient to satisfy the estimated value of the harvest characteristic during the harvest operation at the defined application rate, or if the initial quantity of the preservative stored in the tank is not sufficient to satisfy the estimated value of the harvest characteristic during the harvest operation at the defined application rate; and
    communicating, with the controller, a notification to a communicator of a work vehicle to notify a system manager when the initial quantity of the preservative stored in the tank is not sufficient to satisfy the estimated value of the harvest characteristic during the harvest operation at the defined application rate, wherein the notification includes an instruction to request additional preservative.

19. The method set forth in claim 18, wherein the estimated value of the harvest characteristic includes one of an estimated number of bales to be formed during the harvest operation, an estimated amount of time the preservative may be applied during the harvest operation, an estimated area of a crop material that may be harvested during the harvest operation, or an estimated weight of the crop material that may be harvested during the harvest operation.

20. The method set forth in claim 18, wherein the estimated value of the harvest characteristic includes an estimated number of bales to be formed during the harvest operation.

21. The method set forth in claim 20, further comprising:
    generating a status signal with the controller, wherein the status signal indicates an estimated number of bales that may be treated with the initial quantity of the preservative stored in the tank; and
    communicating the status signal to the communicator, whereby the communicator generates a message to the system manager.

22. The method set forth in claim 20, further comprising:
    continuously determining an actual number of bales formed during the harvest operation;

continuously estimating a remaining number of bales to be formed during the harvest operation based on the estimate of the number of bales to be formed during the harvest operation and the actual number of bales previously formed during the harvest operation;

continuously sensing a current quantity of the preservative stored in the tank during the harvest operation;

continuously calculating an actual application rate of the preservative applied per bale for the actual number of bales previously formed during the harvest operation, based on a difference between the initial quantity of preservative stored in the tank and the current quantity of the preservative stored in the tank;

continuously determining if the current quantity of the preservative stored in the tank is sufficient to treat the estimated remaining number of bales to be formed during the harvest operation at the actual application rate, or if the current quantity of the preservative stored in the tank is not sufficient to treat the estimated remaining number of bales to be formed during the harvest operation at the actual application rate; and communicating the notification to the system manager requesting additional preservative when the current quantity of the preservative stored in the tank is not sufficient to treat the estimated remaining number of bales to be formed during the harvest operation at the actual application rate.

23. The method set forth in claim 22, further comprising continuously updating a status signal to indicate an estimated number of bales that may be treated with the preservative in the tank based on the current quantity of the preservative stored in the tank and the actual application rate of the preservative applied per each bale.

24. The method set forth in claim 18, wherein the system manager includes a computing device located remotely from the baler implement and operable to automatically request a re-supply of the preservative upon receipt of the notification.

25. The method set forth in claim 18, further comprising automatically controlling application of the preservative onto a crop material with the controller, based on at least one harvest related parameter, wherein the at least one harvest related parameter includes one of a moisture content of the crop material, a mass flow rate of the crop material, a current weather condition of a location of the harvest operation, a predicted weather condition of the location of the harvest operation, a moisture content of the soil of the location of the harvest operation, a surface elevation of the location of the harvest operation, a time period for the harvest operation, a date of the harvest operation, or an estimated number of bales remaining to be formed during the harvest operation.

* * * * *